(12) United States Patent
Chou (10) Patent No.: US 7,628,500 B2
(45) Date of Patent: Dec. 8, 2009

(54) LUMINOUS KEYBOARD

(75) Inventor: Chin-Wen Chou, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 238 days.

(21) Appl. No.: 11/797,311

(22) Filed: May 2, 2007

(65) Prior Publication Data

US 2008/0273318 A1 Nov. 6, 2008

(51) Int. Cl.
*H01H 13/70* (2006.01)
*F21V 33/00* (2006.01)
*H01H 9/00* (2006.01)

(52) U.S. Cl. .............................. 362/30; 362/29; 362/84; 200/314

(58) Field of Classification Search .................... 362/29, 362/30, 84, 85; 200/314
See application file for complete search history.

(56) References Cited

U.S. PATENT DOCUMENTS

| | | | |
|---|---|---|---|
| 6,179,432 B1 | 1/2001 | Zhang et al. | |
| 6,199,996 B1 | 3/2001 | Katrinecz, Jr. et al. | |
| 6,284,988 B1 | 9/2001 | Watanabe et al. | |
| 6,322,229 B1 | 11/2001 | Chan et al. | |
| 6,429,853 B1 * | 8/2002 | Chou | 345/168 |
| 6,554,442 B2 | 4/2003 | Chou | |
| 6,609,805 B1 * | 8/2003 | Nelson | 362/30 |
| 7,154,059 B2 | 12/2006 | Chou | |

FOREIGN PATENT DOCUMENTS

| | | |
|---|---|---|
| TW | 438035 | 5/2001 |
| TW | 465777 | 11/2001 |
| TW | 468833 | 12/2001 |
| TW | 509955 | 11/2002 |
| TW | 516671 | 1/2003 |
| TW | 535385 | 6/2003 |
| TW | 570235 | 1/2004 |
| TW | I269333 | 12/2006 |

* cited by examiner

*Primary Examiner*—Stephen F Husar
*Assistant Examiner*—James W Cranson
(74) *Attorney, Agent, or Firm*—Muncy, Geissler, Olds & Lowe, PLLC (57) ABSTRACT

A luminous keyboard includes a cap which has a bottom lid with a first light directing zone formed thereon. The cap also has a first light blocking surface on an outer surface corresponding to the first light directing zone. At least one luminous unit is provided to provide light to the first light directing zone so that the light projects to the first light directing zone is diffused and blocked by the first light blocking surface, and finally projected to a keyboard portion to illuminate keycaps. The bottom lid replaces the light directing layer used in the conventional luminous keyboards. Thus the interior space of the keyboard can be shrunk to make fabrication and assembly of the keyboard simpler. The keyboard thus formed is thinner and lighter and suitable for mass production.

7 Claims, 8 Drawing Sheets

LUMINOUS KEYBOARD

FIELD OF THE INVENTION

The present invention relates to a luminous keyboard and particularly to a luminous keyboard that has a bottom lid formed with a light directing zone.

BACKGROUND OF THE INVENTION

Nowadays computers are widely used in almost every aspect of people's life. Desk top computers, laptops, notebook computers or NetTVs are ubiquitous. In a low light or dark environment lack of light makes correct striking of the keyboard difficult that could result in inaccurate signal output. To solve this problem many types of luminous keyboards have been proposed in prior art, such as U.S. Pat. Nos. 6,284, 988, 6,322,229, 6,199,996, 6,554,442 and 6,179,432, and R.O.C. patent publication Nos. 509955, 465777, 535385, 438035, 570235, 468833 and 516671. They mostly have a built-in luminous sheet to emit light to enable users to clearly determine the striking position on the keyboard.

For instance, R.O.C. patent publication No. 509955 discloses a luminous keyboard which has a keyboard portion and a backlight means beneath the keyboard. The backlight means provides a light source below the keyboard portion for the keyboard portion. In an embodiment the backlight means includes a light directing plate which has a reflective portion, a reflective plate and a light source. The light source is located at one side of the light directing plate. The light source emits light which is transmitted through the light directing plate below each key. Then the reflective portion reflects the light to illuminate the key.

R.O.C. patent No. I269333 provides a keyboard with a backlight structure. It has a light transmission space located between a base board and a bridge board. The bridge board has at least one light directing portion corresponding to the interval of the keyboard portion and light transmission space. Light emitted by a light source projects to each key through the light transmission space and light directing portion.

However, in the two patents previously discussed light is transmitted to the keyboard through a light directing layer, a light directing object or other light directing aids. By adding the light directing layer or light directing object the thickness and weight of the keyboard increase. Moreover, such a design makes fabrication and assembly more complex. It is against the prevailing trend of computer equipment that demands thin and light.

SUMMARY OF THE INVENTION

The primary object of the present invention is to integrate a backlight structure to make a computer keyboard thinner and lighter to facilitate carrying and utilization. To achieve the foregoing object the present invention provides a luminous keyboard that has a cap on an outer layer consisting of an upper lid and a bottom lid. The upper lid and the bottom lid form a housing compartment between them. The bottom lid has a first light directing zone. The cap has an outer surface to form a first light blocking surface corresponding to the first light directing zone. There is a keyboard portion located in the housing compartment. The keyboard portion includes a plurality of keycaps depressible under forces, a moving mechanism to allow the keycaps to be moved in the depressing direction and a circuit board to receive compression of the keycaps and output electric signals. There is also at least one luminous unit to provide light for the first light directing zone. The light is diffused on the first light directing zone and blocked by the first light blocking surface. Finally the light is projected to the keyboard portion to generate illumination. A mask element also may be provided between the keyboard portion and the bottom lid that has a light permeable zone corresponding to individual keycaps and an impermeable zone where no keycaps are located. The light passes through the light permeable zone to illuminate the keycaps.

The luminous keyboard of the invention can reduce the internal space occupied by the light directing layer or light directing object of the conventional designs. There is also no need to add an extra light directing layer or light directing object. Thus the keyboard can be made lighter and thinner. In addition, through the light directing design, mold fabrication and manufacturing and assembly are easier. Production cost is lower and production yield is higher.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENTS

Figure 1:
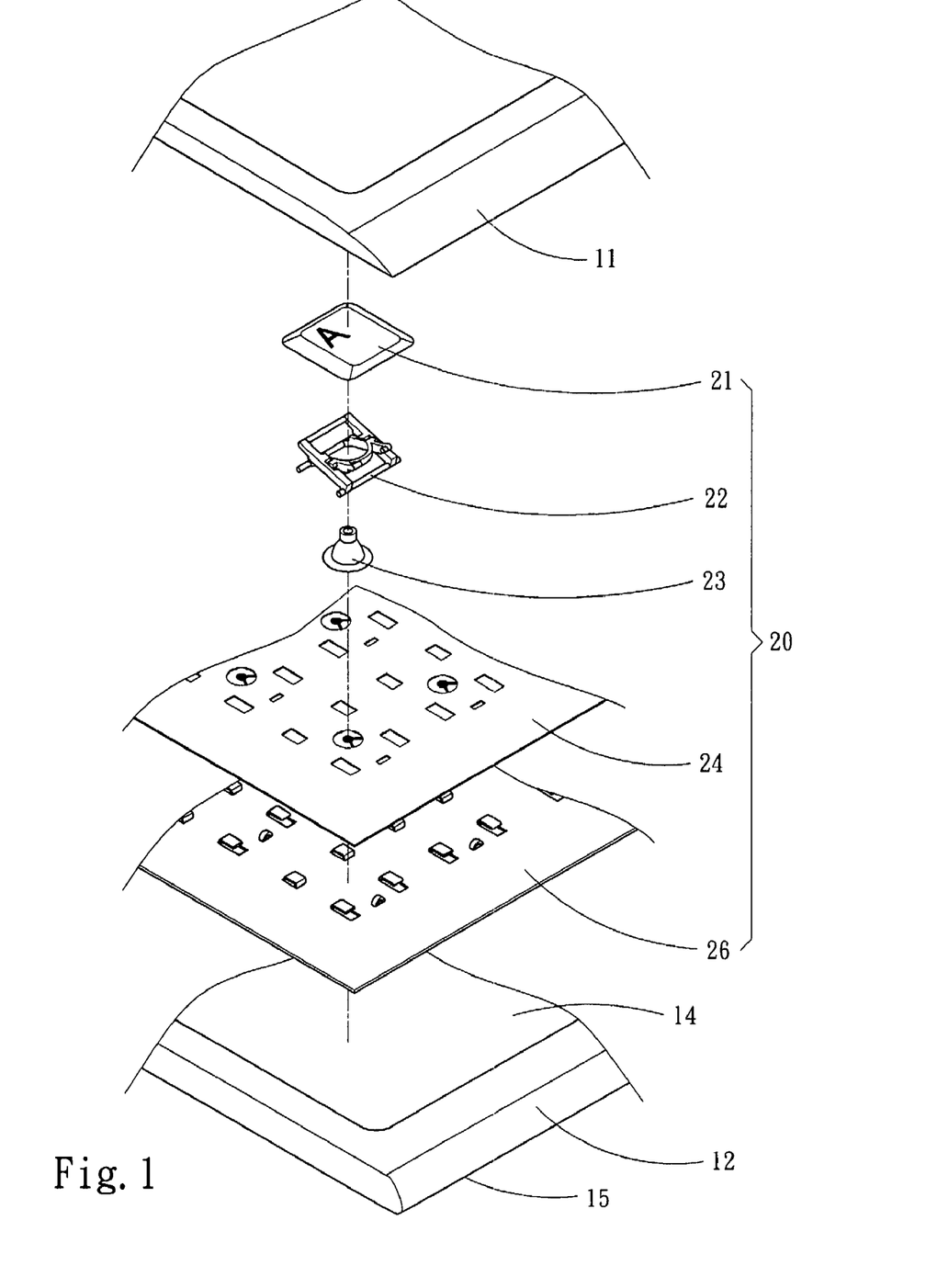
FIG. 1 is an exploded view of an embodiment of the luminous keyboard of the invention.
Figure 2:
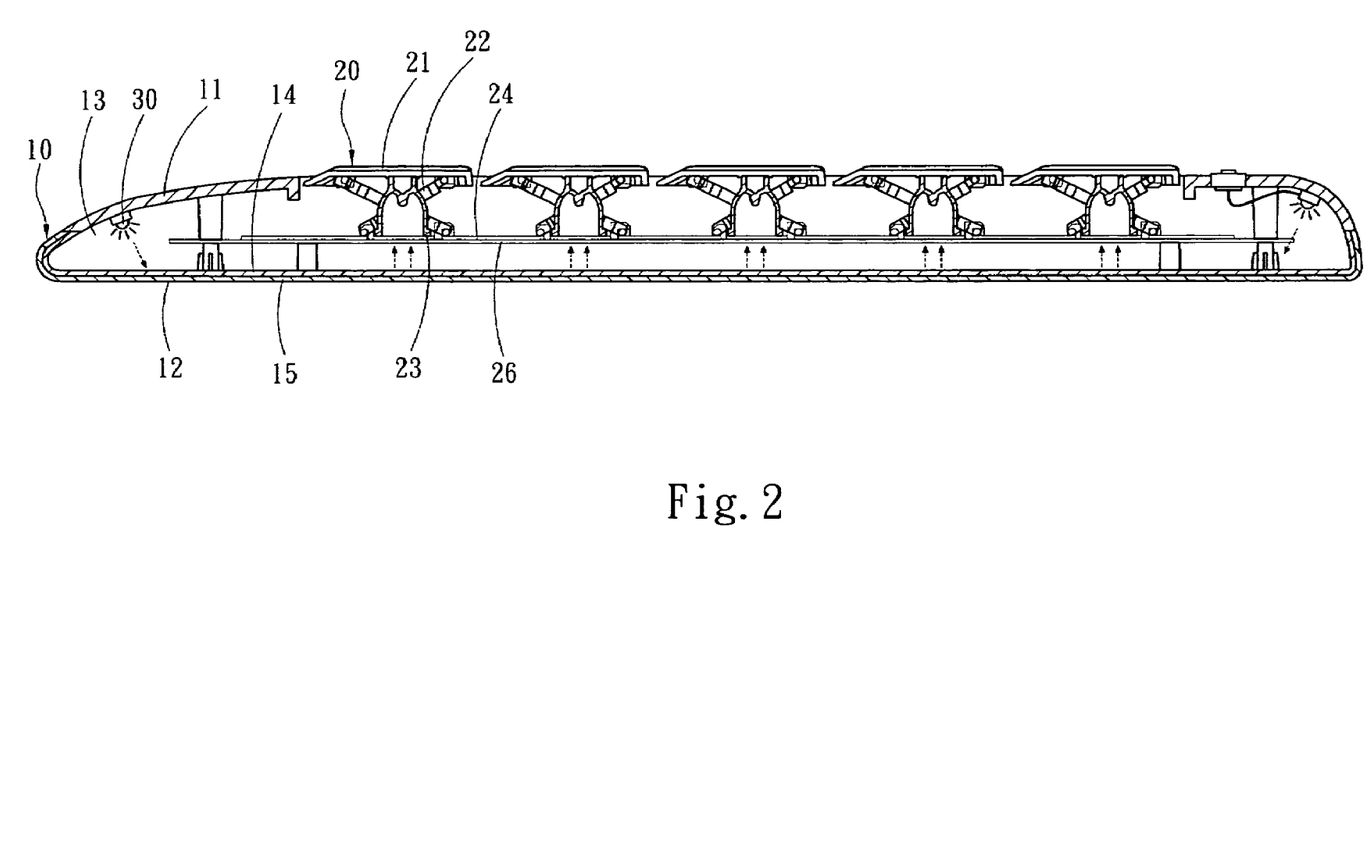
FIG. 2 is a sectional view of an embodiment of the luminous keyboard of the invention.
Figure 3:
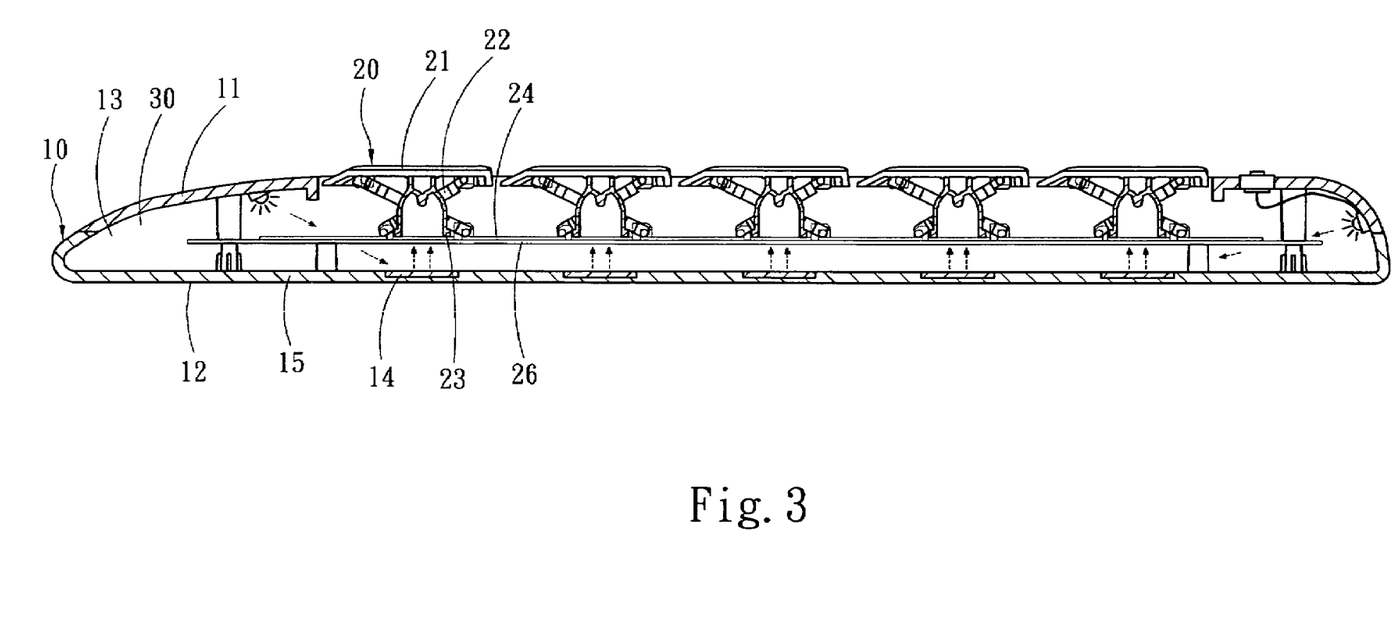
FIG. 3 is a sectional view of an embodiment of the invention showing a light directing zone formed merely in a portion of the bottom lid.

Please refer to FIGS. 1 and 2 for an embodiment of the luminous keyboard of the invention. It aims to be used in a dark or low light environment. It has a cap 10 on an outer side consisting of an upper lid 11 and a bottom lid 12 coupling together to form a housing compartment 13 between them. At least the bottom lid 12 has a first light directing zone 14, and a first light blocking surface 15 on an outer surface corresponding to the first light directing zone 14. The first light directing zone 14 may be formed on the entire bottom lid 12 (referring to FIG. 2) or merely formed at a portion of the bottom lid 12 (referring to FIG. 3). The housing compartment 13 holds a keyboard portion 20 which includes a base board 26, a plurality of keycaps 21 on the base board 26 depressible under forces, and a plurality of moving mechanisms 22 between the keycaps 21 and the base board 26 that are movable in the depressing direction of the keycaps 21 (in the shown embodiment a bridge moving mechanism is used. It also may be a vertical moving mechanism. There is no limitation in terms of the moving mechanism 22 to be used in the invention). When each keycap 21 is depressed, an elastic element 23 is compressed to trigger a circuit board 24 to output an electric signal. In addition, at least one luminous unit 30 is provided which may be an LED, optical fibers or other light generating element. The luminous unit 30 may be located on the upper lid 11, the bottom lid 12, or any location in the housing compartment 13. The luminous unit 13 provides light to the first light directing zone 14 and can directly project the light to the first light directing zone 14, or through reflection of the upper lid 11 to the light directing zone 14. The light is diffused on the first light directing zone 14 and blocked by the first light blocking surface 15 to project upwards to the keyboard portion 20 to generate illumination. The base board 26, moving mechanism 22, elastic element 23 and circuit board 24 of the keyboard portion 20 are made from transparent materials so that the light reflected by the first light directing zone 14 can smoothly enter the individual keycaps 21.

Figure 4:
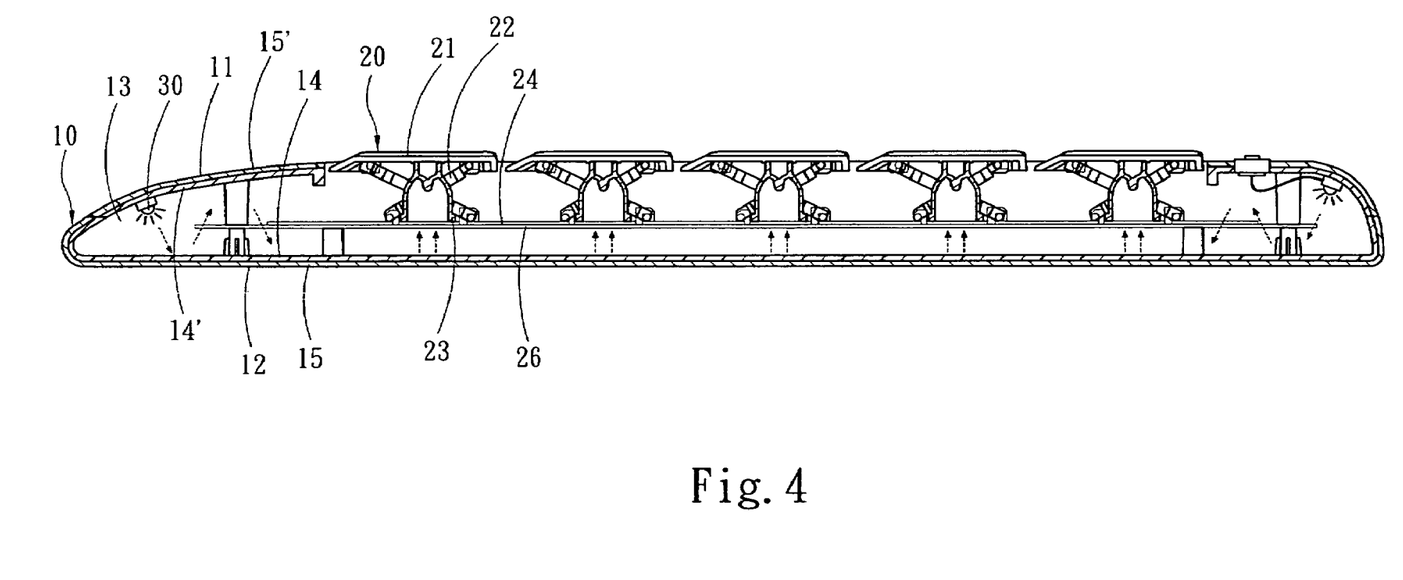
FIG. 4 is a sectional view of an embodiment of the invention showing a light directing zone formed in the upper lid and the bottom lid.

Refer to FIG. 4 for another embodiment of the invention. The upper lid 11 may also have a second light directing zone 14' corresponding to the light projection area of the first light directing zone 14, and the outer surface of the upper lid 11 has a second light blocking surface 15' corresponding to the second light directing zone 14'. When the luminous unit 30 provides light to the second light directing zone 14', or the light projected to the first light directing zone 14 is reflected or transmitted to the second light directing zone 14', both the upper lid 11 and the bottom lid 12 can be illuminated so that the light can fill the housing compartment 13.

Figure 5A:
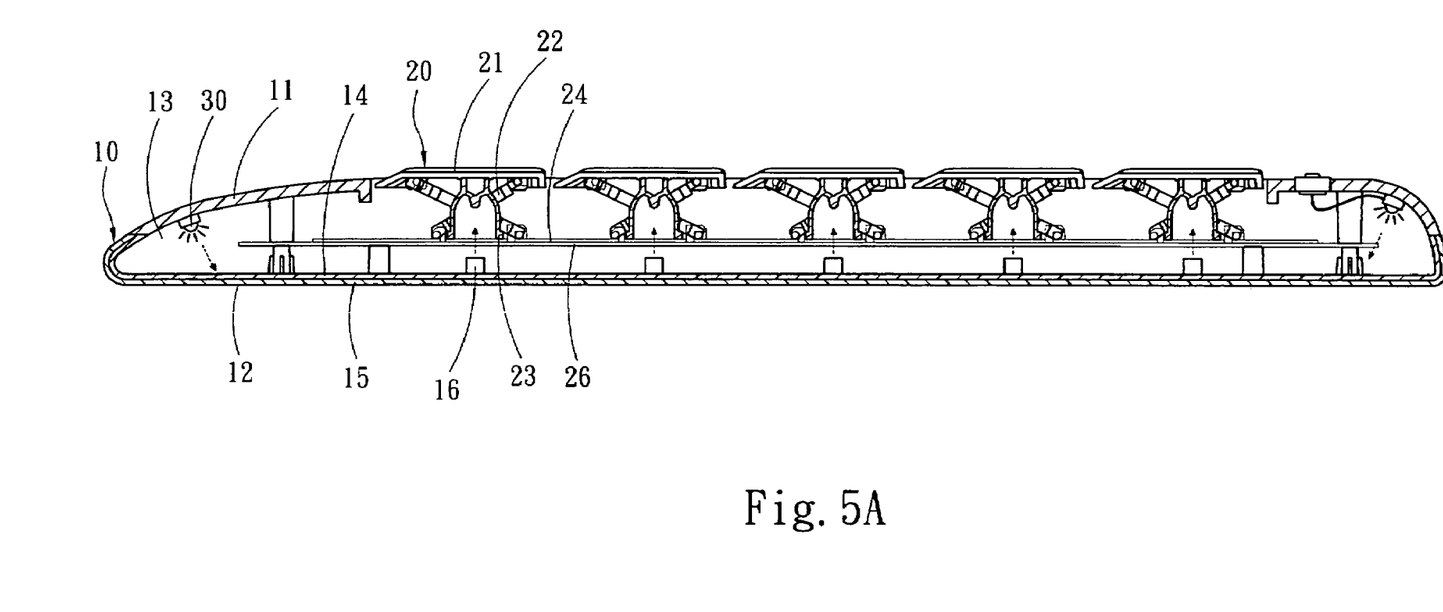
FIG. 5A is a sectional view of another embodiment of the invention with a light converging strut located on the bottom lid.
Figure 5B:
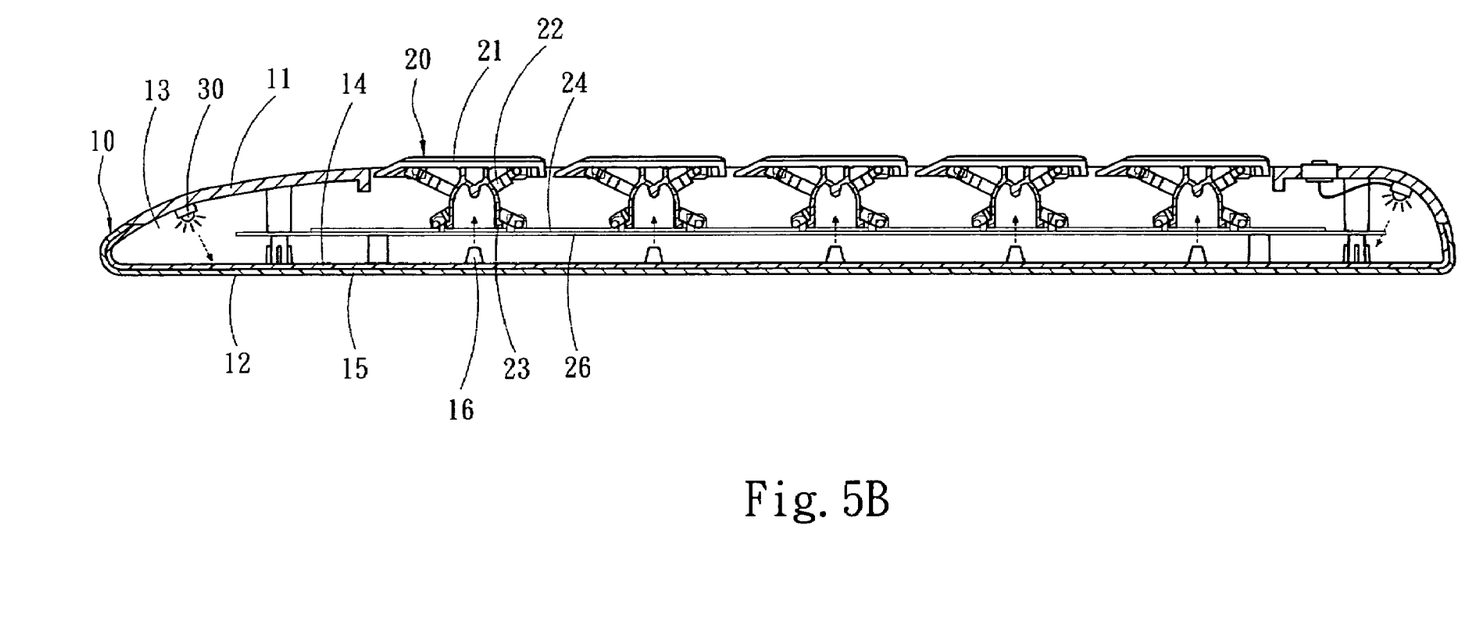
FIG. 5B is a sectional view of yet another embodiment of the invention with a light converging strut located on the bottom lid.

In order to converge the light to the individual keycap 21, referring to FIG. 5A, at least one light converging strut 16 is provided at the light projection location of the first light directing zone 14 corresponding to the keyboard portion 20 to facilitate concentration of the light entering the keyboard portion 20. The light converging strut 16 may be a pillar of equal sides (referring to FIG. 5A), or a pillar with a tapered upper end (referring to FIG. 5B).

Figure 6:
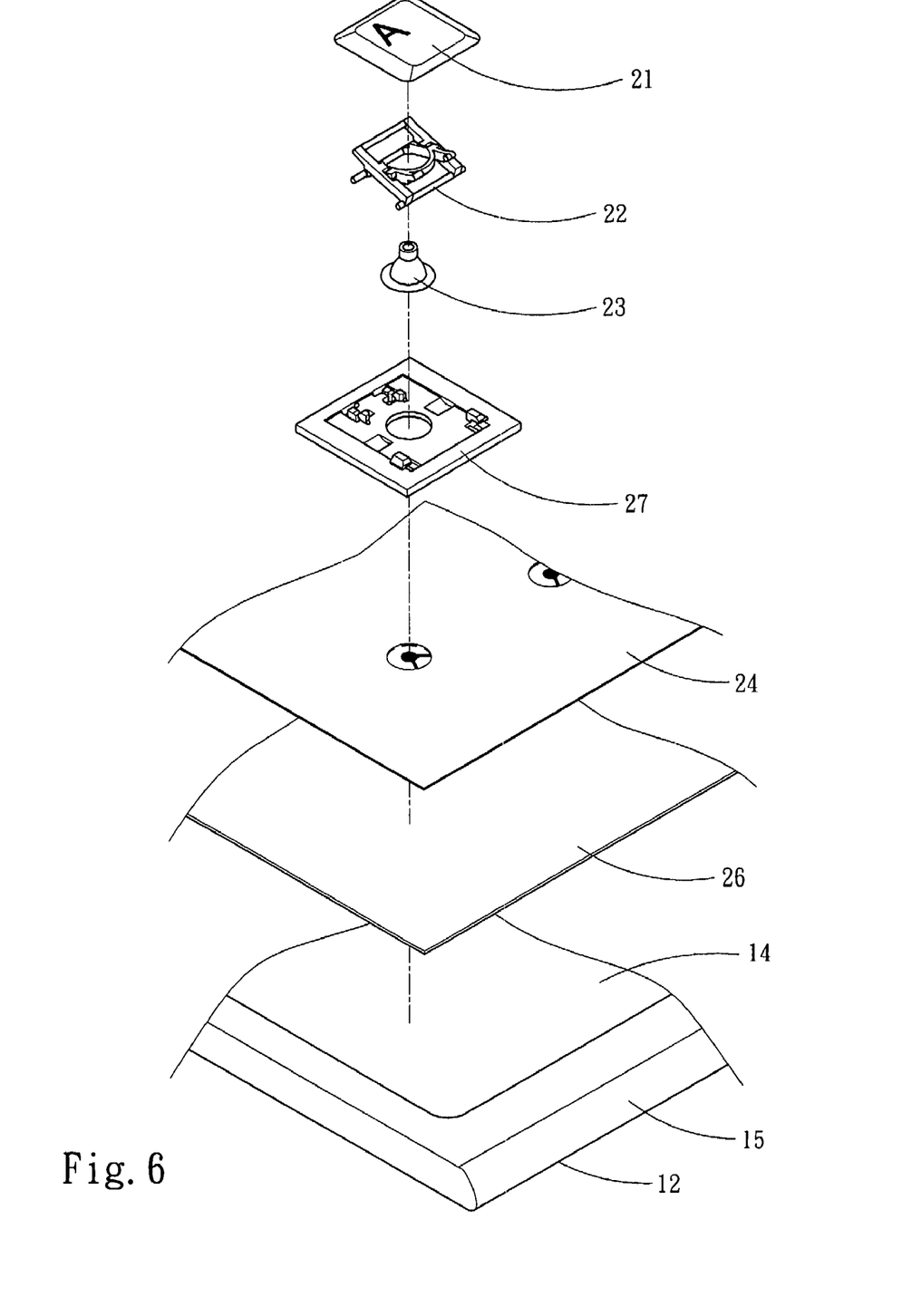
FIG. 6 is an exploded view of still another embodiment of the invention with a bridge plate.

In the conventional keyboard a bridge plate may be used to hold the moving mechanism as shown in FIG. 6. This may form another embodiment of the invention, but is not the limitation. A bridge plate 27 is provided to hold the moving mechanism 22 and located between the keycaps 21 and the circuit board 24. The bridge plate 27 is made from a transparent material without hindering light projection from the first light directing zone 14 to the keyboard portion 20.

Figure 7:
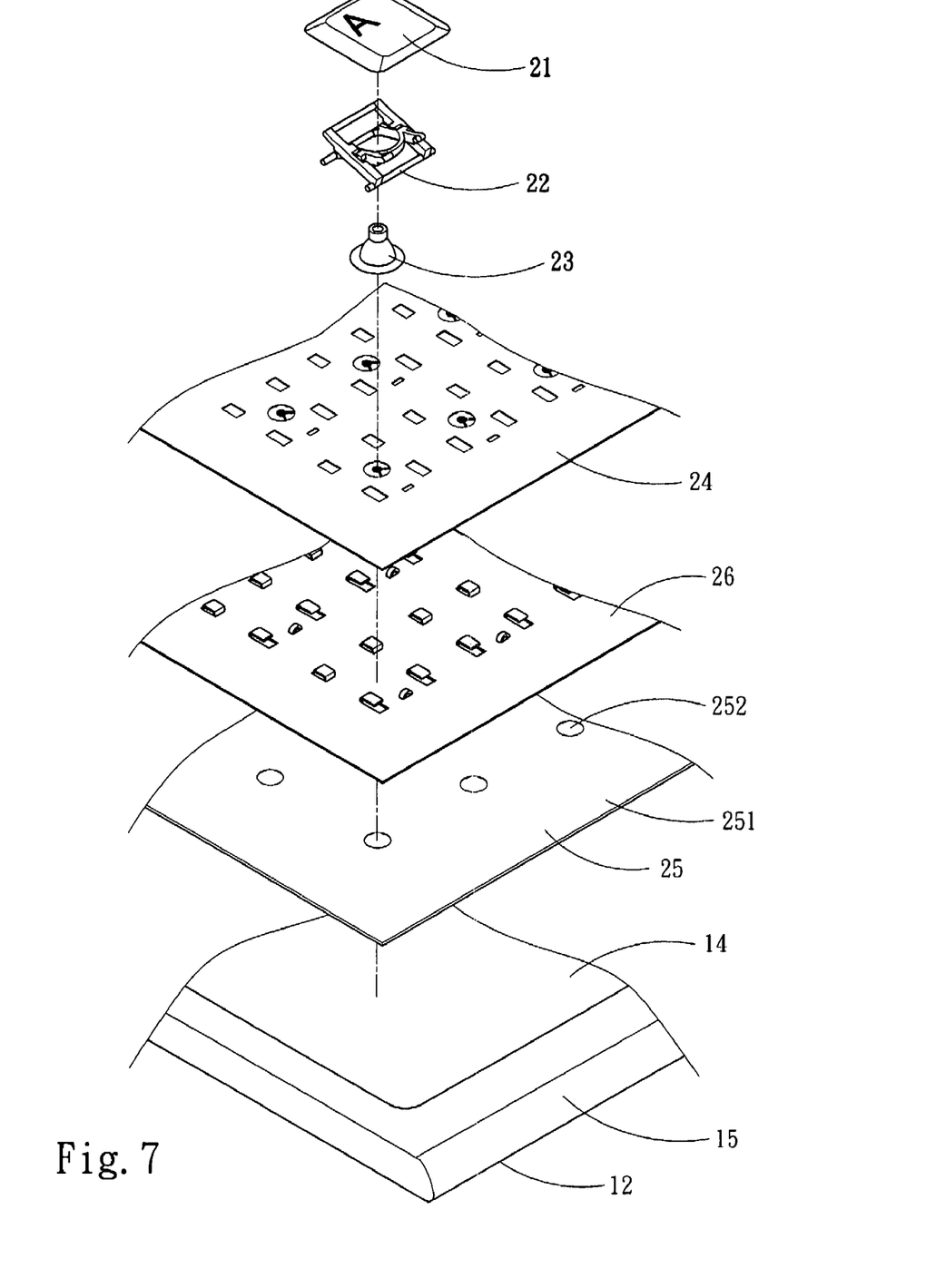
FIG. 7 is an exploded view of another embodiment of the invention in an unevenly luminous condition.

The luminous keyboard of the invention may also adopt the one disclosed in U.S. Pat. No. 7,154,059 entitled "Unevenly illuminated keyboard" as shown in FIG. 7. There is a mask element located between the keycaps and the base board. The mask element has a light permeable zone and a light impermeable zone to unevenly illuminate the keyboard. Aside from the embodiment discussed previously, a mask element 25 may be deployed between the keyboard portion 20 and the bottom lid 12 with a light permeable zone 251 corresponding to each keycap 21, and a light impermeable zone 252 corresponding to the area where no keycap 21 is located. Thereby light emitted from the luminous unit 30 can project to the light directing zone 14 and pass through the light permeable zone 251 to illuminate the individual keycap 21, and expand to the area between the bottom lid 12 and the keycap 21 to achieve an unevenly illumination effect.

The invention uses the upper lid 11 or bottom lid 12 to transmit light to the keyboard portion 20. Compared with the conventional keyboards that require additional light directing elements, the invention can save the space of the housing compartment 13 so that the keyboard can be made thinner and lighter. Molding fabrication and production and assembly processes can be reduced. Production cost is lower and production yield is higher.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A luminous keyboard, comprising:
   a cap which includes a upper lid and a bottom lid that are coupled together to form a housing compartment therebetween, at least the bottom lid having a first light directing zone and a first light blocking surface on an outer surface corresponding to the first light directing zone;
   a keyboard portion which is located in the housing compartment and includes a plurality of depressible keycaps moving in the direction of depression, a moving mechanism to allow the keycaps to move in the depression direction and a circuit board to be triggered by the compression of the keycaps to output electric signals; and
   at least one luminous unit to provide light to the first light directing zone such that the light is diffused on the first light directing zone and blocked by the first light blocking surface and projected upwards to illuminate the keyboard portion.

2. The luminous keyboard of claim 1, wherein the upper lid has a second light directing zone corresponding to the light projecting location of the first light directing zone and a second light blocking surface on an outer surface thereof corresponding to the second light directing zone.

3. The luminous keyboard of claim 1, wherein the light projecting location of the first light directing zone has at least one light converging strut corresponding to the keyboard portion to converge the light entering the keyboard portion.

4. The luminous keyboard of claim 1 further having a mask element between the keyboard portion and the bottom lid that has a light permeable zone corresponding to the individual keycaps and a light impermeable zone corresponding to areas where none of the keycaps are located, the light passing through the light permeable zone to illuminate the keycaps.

5. The luminous keyboard of claim 1, wherein the luminous unit is located on the bottom lid.

6. The luminous keyboard of claim 1, wherein the luminous unit is located on the upper lid.

7. The luminous keyboard of claim 1, wherein the luminous unit is located in the housing compartment.

* * * * *